(12) United States Patent
Landau et al.

(10) Patent No.: US 12,032,159 B2
(45) Date of Patent: Jul. 9, 2024

(54) OPTICAL MODULE HAVING ACTIVE ARRAY OF ELEMENTS CAPABLE OF SYNCHRONIZING WITH SEE-THROUGH DISPLAY

(71) Applicant: NewSight Reality, Inc., Roanoke, VA (US)

(72) Inventors: Igor Landau, Boulder, CO (US); Rick Morrison, Longmont, CO (US); Svetlana Samoilova, Alameda, CA (US)

(73) Assignee: NewSight Reality, Inc., Ponte Vedra, FL (US)

( * ) Notice: Subject to any disclaimer, the term of this patent is extended or adjusted under 35 U.S.C. 154(b) by 0 days.

(21) Appl. No.: 17/991,043

(22) Filed: Nov. 21, 2022

(65) Prior Publication Data

US 2023/0088014 A1    Mar. 23, 2023

Related U.S. Application Data

(63) Continuation-in-part of application No. 17/236,949, filed on Apr. 21, 2021.

(51) Int. Cl.
*G02B 27/00* (2006.01)
*G02B 27/01* (2006.01)
*G09G 3/00* (2006.01)
*G06F 111/18* (2020.01)

(52) U.S. Cl.
CPC ......... *G02B 27/0101* (2013.01); *G09G 3/001* (2013.01); *G06F 2111/18* (2020.01); *G09G 2320/0613* (2013.01); *G09G 2320/10* (2013.01); *G09G 2340/10* (2013.01); *G09G 2360/144* (2013.01)

(58) Field of Classification Search
CPC ............... G02B 27/0101; G09G 3/001; G09G 2320/0613; G09G 2320/10; G09G 2340/10; G09G 2360/144; G06F 2111/18
See application file for complete search history.

(56) References Cited

U.S. PATENT DOCUMENTS

| | | | |
|---|---|---|---|
| 10,989,922 B2 | 4/2021 | Ha et al. | |
| 2015/0070742 A1* | 3/2015 | Sorek | H04N 13/341 359/890 |
| 2020/0105047 A1* | 4/2020 | Huang | H04N 21/21805 |
| 2021/0120258 A1* | 4/2021 | Clucas | H04N 19/33 |
| 2021/0132323 A1* | 5/2021 | Hudman | G02C 7/086 |
| 2021/0223601 A1 | 7/2021 | Van Heugten et al. | |
| 2021/0303748 A1* | 9/2021 | Malekian | G06F 30/12 |

FOREIGN PATENT DOCUMENTS

WO    2021261710 A1    12/2021

\* cited by examiner

*Primary Examiner* — Roy P Rabindranath
(74) *Attorney, Agent, or Firm* — Woods Rogers Vandeventer Black PLC; Nathan A. Evans

(57) ABSTRACT

A multiplexed, synchronized active beam splitter or mirror and display providing a user or manufacturer with the ability to choose different modes of functionality of a transparent optical module.

19 Claims, 6 Drawing Sheets

OPTICAL MODULE HAVING ACTIVE ARRAY OF ELEMENTS CAPABLE OF SYNCHRONIZING WITH SEE-THROUGH DISPLAY

CROSS-REFERENCE TO RELATED APPLICATIONS

The present application relies on the disclosures of and claims priority to and the benefit of the filing date of U.S. patent application Ser. No. 17/236,949, filed Apr. 21, 2021. The disclosures of that application are hereby incorporated by reference herein in their entireties.

BACKGROUND OF THE INVENTION

Field of the Invention

The present invention in aspects provides an active mirror/beamsplitter solution for augmented reality ("AR") that is a superior solution to current approaches to AR that utilize various beam splitters to combine virtual images and real world images; existing approaches using beam splitters will realize superior performance if they employ active beam splitters as described herein. In aspects, the current invention provides for an optical module comprising and using active beam splitters, which can be turned On and Off in sync with a display (e.g., a display flashing virtual images). An advantage realized by the current invention, by way of example only, is that the beam splitters can be in the Off state a majority of the time, in aspects, so as not to obscure the real world (i.e., images from the real world or cause distracting/non-optimal stray light). Then, in the On state, a duty cycle can activate the beam splitters as a display is activated to create a virtual image directed to an eye of the wearer of the AR system. In embodiments, a duty cycle of 10% can be used (i.e., 10% in the On state and 90% in the Off state), but the duty cycle can also be dependent on external screen brightness; accordingly, in aspects, they duty cycle can be from 0-100%, such as 0% to 10%, from 10% to 20%, from 20% to 30%, and so on up to 100% or 99%.

In embodiments, the On state will be flashed or otherwise turned On at movie frame rates, such as, by way of example, so higher than 24/30 Hz in a preferred embodiment, or in the 45/60 Hz in another preferred embodiment, to minimize shutter effects. Slower and faster frame rates are envisioned, but generally higher frame rates are preferred, including over 10 Hz, over 20 Hz, over 30 Hz, over 40 Hz, over 50 Hz, over 60 Hz, and so on.

In embodiments, an active beam splitter mechanism comprises a thin layer of Liquid Crystals ("LC") (or nano-scale polymer encapsulated or dispersed liquid crystals ("nPDLCs")) in a configuration that will deploy an LC/nPDLC layer as part of a beam splitter coating, which will allow for switching the coating from an anti-reflective Off state (e.g., see-through state) to a reflective On state (e.g., mirror/reflective state). In other embodiments the active beam splitter mechanism can be electrochromic.

In aspects, the current invention utilizes either reflective-, refractive-, or polarized-based beam splitters, or combinations thereof, and/or mirrors in order to combine (superimpose) the real scene from the real world with an augmented/enhanced/mixed reality virtual image. The active mirrors or various beam splitters can be turned Off to maximize light transmission (passing of light through the active beam splitter) from the real world to reach the eye of the wearer, free or mostly free from any scatter of diffraction from currently available mirror facets and like obscurations (e.g., stray light), and then briefly turned On to redirect into the eye the image from a display, which will be made to flash in sync with the On state. In aspects, this inventive solution will both maximize light transmission (passing through) from the real world into the eye, while minimizing stray light from the mirror obscurations, and also maximize light efficiency from the display to the eye of the wearer. According to the current invention, in aspects, this can be done without having to compromise on mirror number or area in order to achieve maximum desired field of view ("FOV") and brightness.

In another embodiment of the current invention, active light blocking elements can be used to block stray light. In an On state, light blocking elements will become non-transparent, textured, opaque, or otherwise capable of blocking light, such as stray light. In an Off state, the light blocking elements will allow for the transmission of light.

The present invention is further directed to operation of a near eye augmented reality ("AR") system, which includes AR, mixed reality ("MR"), extended reality, enhanced reality, or virtual reality ("VR"), that combines the virtual image generated by the near eye display with the real world environment taking into account, for example, the visual processes of the retina, the visual cortex, and the oculomotor system. Specifically, the current invention is directed to transparent or nearly transparent optical module ("TOM") architecture, which is built and/or configured in a manner to provide system scalability in higher resolution and later field of view and eye box. However, the invention herein can be directed to other near eye display architectures and optical solutions that comprise transparent display and mirrors and/or light blocking elements for presenting a virtual image (or portion of a virtual image) overlaid with a real world view.

The present invention also is directed to a synchronization, in cases temporal synchronization, between mirrors (read interchangeably with beam splitters) and the display so that the two work together in concert to provide a user or manufacturer with enhanced brightness of real world images, enhanced brightness of virtual images, lower power requirements, and other improvements over existing technology. The present invention is further directed to active light blocking elements to help mitigate stray light usually inherent in, for example, AR systems.

DESCRIPTION OF THE RELATED ART

Currently existing AR or MR systems in most cases have several shortcomings including, but not limited to, large shape/form factor, awkward wearability and utilization (due to problematic human ergonomics,) heavy hardware, uneven weight distribution, high power demand (due to low optical/light efficiency), thermal limitations, insufficient transparency and low brightness for operating in daylight, and/or high price (and cost to manufacture). For these systems to have an increased level of adoption, a transformational technology change or innovation is needed to improve what is currently available. In addition, it is important that any such innovation can be easily adapted to current, established eyewear and ophthalmic lens manufacturing and distribution. The innovation disclosed herein teaches such a transformational breakthrough for the AR and MR industries. In this regard, the current innovation can also be used with virtual reality and extended/mixed reality.

SUMMARY OF THE INVENTION

In existing AR systems, a virtual image is emitted, for example, downwards or upwards, to a beam splitter, which then redirects that virtual image to an eye of the wearer. The display can be under the eye, over the eye, or beside the eye. However, while the beam splitter can redirect the beam of light to the eye, it is also somewhat transparent to real world light that can travel through the beam splitter to the eye, thereby creating AR or a variant thereof. However, the real world light can be affected by the beam splitter, causing stray light, decreasing brightness, or otherwise resulting in real world light not meeting the eye or creating distracting, non-optimal aberrations. According to the current invention, a beam splitter can be used, but an active beam splitter that can be turned On and Off can improve the existing technology by enhancing brightness, cutting down on necessary energy, and making it so the beam splitter more optimally reflects display virtual image light and/or more optimally allows real world light to pass to the eye of the wearer. The display may include or be used with one or more light collection lens and/or one or more relay imaging optic.

In other words, a beam splitter turned On can reflect display light to a wearer. Because it is turned On, in aspects, for a short duty cycle relative to real world light entering the eye, it can be more reflective than existing technology, thereby enhancing reflectivity and brightness. Because when turned Off it can allow more real world light to enter the eye than real world light passing through existing beam splitters, it can enhance the brightness of real world light. Because of the possibility of a short duty cycle, the power demands can be less.

In embodiments of the present invention, a transparent optical module ("TOM") system or device comprises an optical architecture hierarchy based on a patch unit. In aspects, the module may be transparent, transmissive, partially transparent, partially transmissive, opaque, partially opaque, or combinations thereof. In aspects, a patch unit of pixels comprises one or more regions of display pixels, or a pattern(s) or pixels. In embodiments, one or more lenses can be used, such as an associated 2D array of small micro lenses (generally referred to herein as "lenses," "lenslets," or "micro lenses"), for example on an aMLA. (Herein, the terms lenslet and micro lens are used interchangeably with regard to the aMLA.) The lens or lenslet is capable of collecting some, most, or all of the light from the display pixels and transmitting that display-emitted light to an eye of the wearer of the TOM which then focuses the light to form a retinal image, which is seen or perceived by the wearer. In embodiments, that display-emitted light is reflected by an active mirror/beam splitter as described herein. The Display+active beam splitter+eye together function to construct a virtual image that may appear to have come from infinity (far field), near the person (near field), or anywhere in between. Multiple TOMs can be combined to provide multiple (virtual) image planes and places. Alternatively, a single TOM can be used to generate for the user a perception of multiple image planes by varying the effective focal length, such as the focal length of the active beam splitter, lens, or lenslets of an MLA in time. Finally, both of the above methods may be combined to realize additional focal plane diversity which can, for example, create a perception of a three-dimensional (3D) image(s), further enhancing the immersion effect of the TOM described herein.

In embodiments, the patch units can be combined further into patch groups, wherein members of a group serve a similar role in retinal image production as a patch unit and lenslet and/or active beam splitter. This hierarchy allows the system to be scaled to larger and more complex systems, while maintaining lower complexity and lower cost via standardized TOM module bases.

Accordingly, TOM architecture is built in a manner that provides system scalability. In general, there are two basic elements of TOM architecture as described herein: a patch unit (optical) and a patch group (layout). The pixels or patches of pixels may use "xLED," which herein may be used to refer to, cover, or describe, but is not limited to: OLED (organic Light Emitting Diode), TOLED (transparent OLED), microLED (also μLED and mLED), iLED (refers to microLED, inorganic LED), PMOLED and AMOLED (Passive Matrix and Active Matrix OLEDs), QD-LED (quantum dot LED), or combinations thereof.

In aspects, groupings or tilings of pixels and/or pixel patches are used to build a larger mosaic image on the retina. In embodiments, due to magnification, a sparse set of patches, for example, can produce a full image as perceived by a user; accordingly, in aspects groupings of pixel patches are capable of being sparsely distributed due to magnification. In aspects, the display pixel patches form a sparse Near Eye Display ("NED"). In aspects, the active beam splitters/mirrors are separated from one another by areas providing for an optical module that is transparent, such as highly transparent, allowing for low obstruction see-through viewing. In other aspects, because the beam splitters/mirrors are active/modulated, the TOM can have a more dense or dense population of the active beam splitters/mirrors without negatively impacting transmission (passing through) of real world light because the active beam splitters/mirrors can be turned Off while still allowing for a perception of, for example, AR.

In cases, it may be necessary to shield light to control stray light created by aspects of the TOM. Since pixels or patches of pixels in a patch group can act individually, in aspects, the patch groups can be illuminated independently (in aspects, in both space and time), to support different functions. The same is true of the active beam splitters/mirrors. A grid of patches of pixels can be rectangular or hexagonally packed or any other shape. Rectangular packing, in cases, simplifies some aspects of determining how to decompose the digital image data into sub-images.

In aspects described herein, the active mirrors/beam splitters and/or active light blocking elements can comprise or otherwise be accomplished using the following or described as follows:

a switchable, tunable, active mirror/beam splitter and/or light blocking element can mean switchable between two states as described herein;
  a tunable mirror/beam splitter and/or light blocking element can mean allowing two states and also having the capability of having intermediate states, including a range of tunable states (an active beam splitter or mirror encompasses both a switchable and/or a tunable beam splitter or mirror);
  electrically switching active mirrors/beam splitters and/or active light blocking elements;
  nematic phase liquid crystal-based active mirrors/beam splitters and/or active light blocking elements;
  smectic phase liquid crystal-based active mirrors/beam splitters and/or active light blocking elements;
  liquid crystals ("LC" or "LCs");
  cholesteric liquid crystals;
  polymer encapsulated or dispersed liquid crystals;
  nano-scale polymer encapsulated or dispersed liquid crystals;
  blue phase liquid crystal-based active mirrors/beam splitters and/or active light blocking elements;
  electrowetting active mirrors/beam splitters and/or active light blocking elements;

electrostatic active mirrors/beam splitters and/or active light blocking elements;

ferrofuidic active mirrors/beam splitters and/or active light blocking elements;

dielectrophoretic active mirrors/beam splitters and/or active light blocking elements;

pressure actuated liquid active mirrors/beam splitters and/or active light blocking elements;

micro-mechanical active mirrors/beam splitters and/or active light blocking elements;

elastomeric membrane active mirrors/beam splitters and/or active light blocking elements;

mechanically stretchable active mirrors/beam splitters and/or active light blocking elements;

chemically ion activated active mirrors/beam splitters and/or active light blocking elements; and/or acousto-optical active mirrors/beam splitters and/or active light blocking elements.

In embodiments, the invention is an optical system for producing an image including a see-through near eye optical module comprising active beam splitters/mirrors, a plurality of light-emitting pixels or pixel patterns, and the lenses and/or micro-lenslet array; wherein the plurality of light-emitting pixels are configured as a pixel patch; wherein a pixel patch is in optical communication with (e.g., associated, coupled, or combined with) the one or more beam-splitters/mirrors; and wherein the optical module is capable of permitting light rays from a physical object in an external, real world environment to pass through the see-through near eye optical module to the user's retina. The light from the display and the light from the real world external environment, when combined together, are capable of generating augmented reality, mixed reality, enhanced reality, extended reality, virtual reality, etc. In aspects, the TOM and/or optical module is hermetically sealed. In aspects, hermetically sealing provides resilience with respect to ingress of water, air, UV light, and other unwanted things, as well as decrease a need for recalibration.

In aspects, the mirrors/beam splitters and/or active light blocking elements are capable of being turned "on" ("On") and "off" ("Off"). In the Off configuration or mode, the active mirrors/beam splitters and/or active light blocking elements can effectively act as a see-through window; for example when voltage (or current) is not applied (e.g., the system in naturally in an "off," i.e. transparent, state). In some cases, if the active mirrors/beam splitters and/or active light blocking elements are turned "on" constantly—such as by application of a voltage or current, without cycling between "on" and "off," the active mirrors/beam splitters and/or active light blocking elements will effectively act the same or similar to a static mirror/beam splitter or light blocking element, respectively.

In aspects, the active mirrors/beam splitters will be synchronized (in aspects, in time) to the display so that the display (e.g., in some cases a pixel or plurality of pixels as described herein) may pulse light to coincide with an "on" mode of the active mirrors/beam splitters. For example, in some embodiments, when the active mirror/beam splitter is turned "off," a user will be able to see through the TOM to the external environment, and when the active mirror/beam splitter is turned "on," a user will see a virtual image overlaid with the external environment. Because the eye-brain connection merges the external environment images with the pulsed virtual images, like it does to other multiple static image frames when viewed in rapid succession, such as a motion picture (e.g., movie or video), the TOM is capable of providing, for example, AR or MR that is seamless or nearly seamless (e.g., continuous) in appearance. More specifically, the synchronization between the display, such as a pixel or pixel patch, and an associated active mirrors/beam splitter, can cause the display to activate after or as soon as the active mirrors/beam splitter is complete with its "rise time" and is in its "on" mode. Accordingly, the display will activate such pixels, pixel patches, or pixel or patch groups when the active mirrors/beam splitter reaches its desired state, creating a virtual image and therefore an AR/MR experience to a user. Pulsing the TOM allows for increased allowance of time for heat dissipation, and an increased perception of virtual image brightness (i.e., a higher value of nits), at a lower energy demand than that of an equivalent continuously emitting display, among other things as described herein.

In embodiments, it is possible (and in aspects advantageous) to adjust for each and every (projected) frame, the ratio of "on" to "off" time interval (e.g., "duty cycle") of the active mirrors/beam splitter (or active light blocking element) and the display, changing the ratio from being "on" more or most of the time to being "off" more or most of the time. With the ratio being more or mostly "off" than "on," the display will provide more transparency, whereas having the display being more or mostly "on" than "off" will provide an emphasis on projecting the virtual image, thereby increasing its brightness as perceived by the user's eye. This can aid in an ability of the invention described herein to rapidly and seamlessly adjust/adapt to changing external brightness or ambient light levels such as, for example, when a user is exiting a dark environment and entering a well-lit environment when, for example, exiting a building, and vice versa. In aspects, this "on" to "off" cycle is called a "duty cycle," and the duty cycle can be dynamically and automatically adjusted depending on, for example, the ambient light environment. Thus a ratio of "on" to "off" state may be increased and thereby enhance a perceived brightness of the virtual image or portion of a virtual image provided by the display pixel(s), which is advantageous in a brightly lit ambient light environment. In a dimly lit environment, the ratio of "on" to "off" may decrease, allowing more light from the real world environment to pass through to a user's eye while also not creating such a bright virtual image. The system allows these adjustments, in embodiments, at the active beam splitter/mirror level, the overall display level, and combinations thereof.

This temporal modulation (or temporal multiplexing) also allows for the TOM to be able to switch between different modes, such as, by way of example only, a two-dimensional mode, a three-dimensional mode, a window mode (i.e., a see-through window to an external environment without virtual imagery), a peripheral mode when additional information is displayed on the periphery of the abovementioned TOM (similar to how most cameras display exposure/histogram and other settings on the bottom or side of the frame to aid the user in setting a proper exposure), a "zoom in" and/or "zoom out" mode, a variable brightness mode, and other modes of varying functionalities that differentiate the system from currently available AR, MR, or VR technologies.

BRIEF DESCRIPTION OF THE DRAWINGS

The accompanying drawings illustrate certain aspects of some of the embodiments of the present invention, and should not be used to limit or define the invention. Together with the written description the drawings serve to explain certain principles of the invention.

DETAILED DESCRIPTION

Figure 1B:
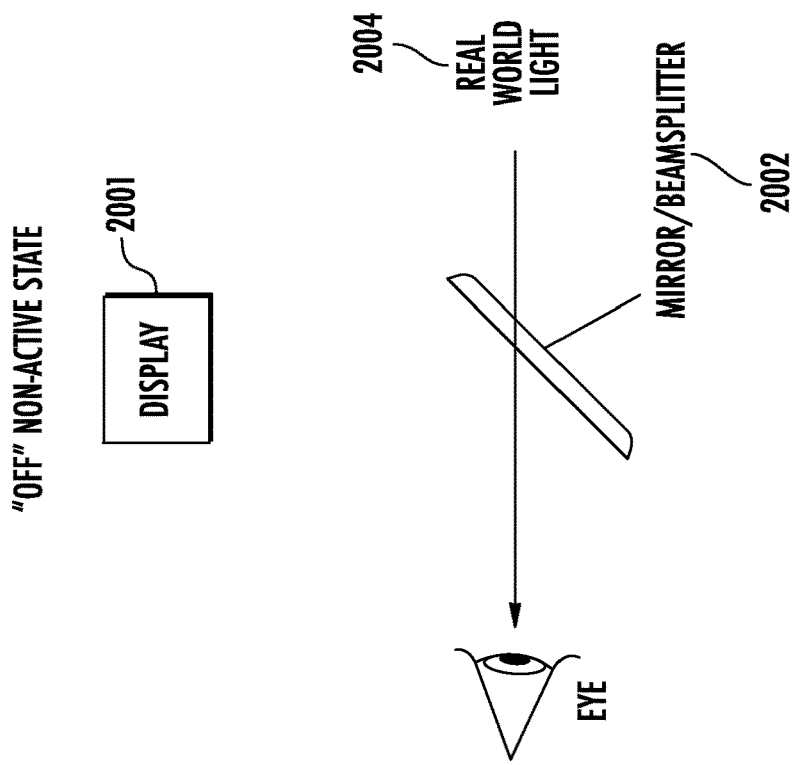
FIGS. 1A and 1B show embodiments of an optical system/module according to the present invention shown in the "on" active state (partially, mostly, substantially, or completely reflective) and the "off" non-active state (partially, mostly, substantially, or completely transmissive).

Reference will now be made in detail to various exemplary embodiments of the invention. It is to be understood that the following discussion of exemplary embodiments is not intended as a limitation on the invention. Rather, the following discussion is provided to give the reader a more detailed understanding of certain aspects and features of the invention.

According to embodiments described herein, there are various optical terms and parameters that describe operation and performance of an active beamsplitter/mirror in optical communication with a pixel or pixel patch. These terms include, but are not limited to, magnification, field of view ("FOV"), resolution, and visual acuity, by way of example. Some of these parameters may influence the optical design and manufacture of the module or active beam splitters/mirrors as described herein, or as would be understood by one of skill in the art.

Further, factors such as the active beam splitter/mirror performance and stray light generation can have an influence on the design FOV. For example, the active beam splitter/mirror pitch, position, angle, and/or power can be designed to vary within the active beam splitter/mirror or across several active beam splitters/mirrors. The pixels or patches of pixels (or patches working in concert) FOV according to preferred embodiments described herein is designed to produce an image that can fill the high-resolution foveal region of a user's retina. The FOV in aspects can range from a 10-degree full angular field up to larger values (or smaller values, if needed). Therefore, multiple patches of pixels can be used to produce a complete wide-angle view.

In embodiments described herein, magnification may describe the relationship between the angular extent at the retina versus that of the display pixel patch or pixel.

The visual acuity of the eye refers to the clarity of vision and ability to recognize detail as described herein or as would be understood by one of skill in the art. The typical eye is able to detect about 1 arc minute angular resolution and is sometimes presented in the form of a measurement, such as 20/20 vision. The visual acuity (e.g., Image Quality ("IQ")) depends on the retinal resolving elements (rods and cones), aberrations from the eye's lens, and diffractive effects due to aperture size as well as the magnitude of the present stray light in a form of haze, etc. Scattered light, haze and other forms of spurious (stray) light can detrimentally affect Image Quality (IQ) and need to be considered and minimized and/or suppressed. The objective of the TOM as described herein is to present information that is a suitable or preferable match to the eye's visual acuity. For example, text should be sufficiently sharp and sufficiently large to be readable, while images should provide preferably well-resolved features. The application of the TOM and system described herein will in aspects determine the visual acuity level that the display, system, or TOM is able to achieve.

The stray light for an active beam splitter differs from a static beam splitter. In embodiments, an active beam splitter is expected to be "on" for only a fraction of time as a wearer uses the TOM described herein. During this switched "on" time, the active beam splitter or mirror operates to reflect a displayed virtual image to a user's eye/retina; the display is synchronized to emit light and provide a virtual image or portion of a virtual image when the beam splitter or mirror is turned "on." During the switched "off" state, in aspects, the beam splitter does not reflect light and allows real world light and images to pass to the user's eye/retina; in other words, in aspects it can act as a conventional transparent window, and the display does not emit light. When the active beam splitter is switched "off," typically less stray light will be present compared to a static beam splitter. In aspects, switching "on" (active) and "off" (non-active) (or tuning a tunable beam splitter) is managed by an electronic system comprising one or processor and/or microcontroller, including a driver that provides for synchronization of "on" and "off" cycles of the Near Eye Display and the active beam splitter.

Since, in aspects, the active beam splitter needs a finite time to transition from "off" to "on" states, and vice versa, it is preferable to minimize the time between transitions, because during the transition time the active beam splitter is in a transient state, which can distort the image of the real-world environment that passes through the active beam splitter, potentially resulting in haze and stray light. In embodiments herein, the "on"-"off" and "off"-"on" transition times preferably range from sub milliseconds (microseconds) to a few milliseconds. The "off state is achieved, in embodiments, by removing a voltage (or current) from the activating mechanism of the active beam splitter, or, alternatively, a reverse voltage (or current) is applied. (The "on" state in this example would occur by applying a voltage to the active beam splitter.) However, in aspects, the "off" state can be achieved by applying a voltage, while the "on" stage occurs by removing voltage or applying a reverse voltage (or current.)

In aspects, to manage the duty cycle applying and removing voltage, the TOM may use a microcontroller and/or a processor that is triggered by a synchronization signal from the Near Eye display, which can in turn create an appropriate driving waveform by writing digital words/code (e.g., providing instructions) at specific times to a bipolar digital-to-analog (DAC) variable-attenuator stage.

A precision DC-balanced square waveform generator can serve as the reference voltage signal for this DAC. A high-voltage, bipolar, fixed-gain "booster" stage can amplify the DAC stage output to the levels necessary to drive the active beam splitter. This configuration can act as an arbitrary function generator to create a tailored electrical waveform that improves or optimizes the speed of formation or functionality of the active beam splitter. In aspects, the microcontroller and/or the processor are capable of reading an integrated temperature sensor located near or adjacent to the active beam splitter, making the system capable of performing temperature compensation by adjusting the driving waveform based on these temperature readings.

In regards to stray light, the term would be understood by one of skill in the art to be light that does not follow the intended or preferred path through an augmented reality system, such as a transparent optical module ("TOM") system or device, and may produce a glare, ghost images, or background haze that reduces overall contrast of the desired virtual and real world images. In instances in the present application, two light channels that we will described for this current setup or configuration; the path for real world light, and the path for display emitted light. Stray light typically occurs when light from one channel becomes inadvertently routed into the other channel. Also described herein is light that is lost by not being directed into either channel.

The desired (or intended) real world imaged light, in aspects, includes the real world view formed from light from the external world that passes through the transparent areas of the display substrate and the regions between beam splitters and light blocking elements. This light enters the eye pupil and is focused by the eye's lens to an image on the retina. The display emitted light follows a path from the display element, is reflected by the beam splitter or mirror, enters the eye's lens and is focused by the eye lens onto the retina. In other aspects, a lens or microlens is used between the display and active beam splitter.

In instances herein, several kinds of light-related terms are referred to, such as the following:

Real World Light (RW)—Light arriving from objects in the external world.

Virtual Display Light (VD)—Display emitted light. This is called a virtual display since it is a virtual image reflected by the active beam splitter or mirror and towards a user's eye.

Thus, according to an embodiment of the current invention, an operation of the active mirrors or beam splitters are pulsed to function only for a brief duration in synchronization with pulsed display emission. On the other hand, static mirrors or beam splitters are typically permanent features; they do not change physical and functional form. Typically the display element emits continuously in this static configuration. Dynamic or active beam splitters or mirrors are elements that operate only during a portion of time, typically when the display is emitting in a pulsed manner.

Figure 1A:
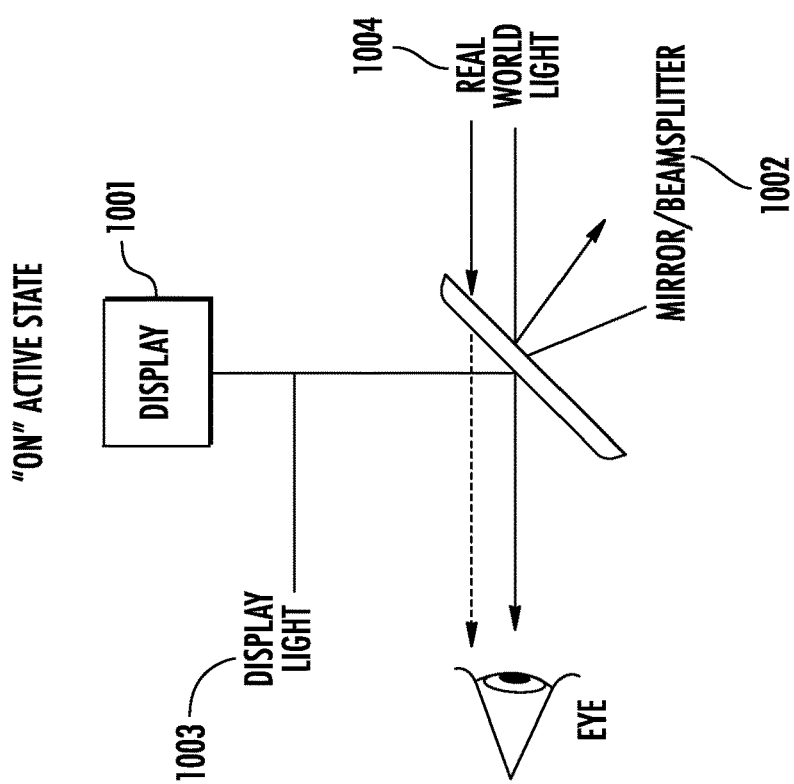

FIGS. 1A and 1B are illustrations of an embodiment according to the current invention. As shown in FIG. 1A, a light emitting display 1001 provides display light 1003 for a virtual image or part of a virtual image. In the "on" active state of the system, the mirror/beam splitter 1002 transitions to a reflective state (partially, mostly, substantially, or completely reflective) to reflect the display light towards an eye of a user of the system. Simultaneously, real world light 1004 is reflected away from the eye, although, in embodiments, some real world light will pass through the mirror/beam splitter and enter the eye of the user (shown by dotted arrow in FIG. 1A). FIG. 1B shows the system in its "off" non-active state. In embodiments, in this non-active state, the display does not transmit an image to the eye. The mirror/beam splitter 2002 transitions to an "off" state such that it is partially, mostly, substantially, or completely transmissive (see-through) to real world light 2004.

In embodiments, the system can include a plurality of beam splitters (such as an array of beam splitters) in the same or in a different plane(s), or in both the same and different planes. Having a plurality of beam splitters can increase the field-of-view ("FOV"), among other things. For example, more than one beam splitter can be in the same plane horizontally to provide a larger/wider horizontal FOV. For example, more than one beam splitter can be in the same plane vertically to provide a larger/higher/lower vertical FOV. For example, more than one beam splitter can be in the same plane horizontally and vertically to provide a larger horizontal and vertical FOV. Thus the FOV can be extended. In aspects, the plurality of beam splitters can be in different planes and thereby extend the FOV in a vertical axis.

In aspects, in the "on" active state, all or some of the display light may be directed towards the eye, and in aspects, some of the real world light stream may still be able to transmit through the active beam splitter to the eye of the user. Thus, in embodiments, the active beam splitter may realize perfect reflection to perfect transmission, and amounts of reflection and transmission in between. Furthermore, the configuration, such as in FIG. 1B can include an optional stray light trap. In aspects, when the system is in the "off" non-active state, the beam splitter is predominantly, partially, mostly, partly, substantially, or completely transparent/transmissive to a real world light stream. In aspects, when the system is in the "on" active state, the beam splitter is predominantly, partially, mostly, partly, substantially, or completely reflective to a light stream from the display.

EXAMPLES

Active Light Blocking Element

Active opto-mechanical shields can be used to block stray light, such as absorbing light pipe(s) between pixels/groupings of pixels/patches and an MLA lenslet or microlenslet, or annular shields around a pixel, pixel patch, lenslet, or microlenslet. In embodiments, the shields are placed at boundaries between the RW and VD optical channels. In aspects, the shields can be pulsed into a transparent mode synchronized with, for example, an active MLA and/or display emission. In other words, digital spatial light absorber(s) between MLA lenslets or microlenslets can be pulsed, absorbing during display emission. These are most suitable for active MLA systems, but are not limited to such systems.

Turning off display elements (e.g., pixels and/or pixel patches) outside one or more vision gaze areas can also be used to reduce stray light. This reduces stray light and peripheral angle light that may be distracting to the user. In aspects, in order to monitor the gaze angle, it may be necessary to include gaze/eye tracking devices in the system.

In an embodiment for stray light blocking, an inter-lenslet absorber can be used. In aspects, display emission light rays that miss a lenslet/microlenslet of an MLA and pass through the area immediately surrounding the lenslet become stray light that creates a haze or halo around the retinal image. The objective is therefore to eliminate this light from reaching the eye. This stray light management method can be applicable to pulsed displays and pulsed MLAs. For example, when the relevant display pixel(s) are "off," the inter-lenslet absorber is turned off so that light from the real world passes through to the eye. When the relevant display pixel(s) are "on," the inter-lenslet absorber is turned on to absorb stray light from the pixel(s) that would create haze. (See, e.g., FIGS. 5-6.) Light from the real world can also be absorbed, so overall transparency would be reduced in some aspects. In embodiments, the absorber can be electronically controlled to be synchronized with pixel(s)/patch(es)/display emission. The inter-lenslet absorber can, in aspects, be one or more forms of liquid crystal material (it is, in aspects, preferable to not be polarization sensitive) or another type of spatial light modulation technique/material.

In another embodiment, active annular lenslet aperture shields are used. In aspects, display emission light rays that miss the lenslet/microlens and pass through the area immediately surrounding the lenslet/microlens become stray light that creates a haze or halo around the retinal image. The objective is therefore to partially, mostly, or completely eliminate this light from reaching the eye. Most of the stray light passes through the area surrounding the lenslet/microlens, especially the area closest to the lenslet/microlens. Therefore, an annular shield with the lenslet inside the inner diameter can eliminate a substantial amount of this light. The eye pupil diameter can have an influence on the size of this area, where larger eye pupil diameters lead to more stray light. An advantage of the shield is stray light reduction. In aspects, these active annular regions can be pulsed absorbing regions, similar to the active inter-lens absorber described herein.

Figure 5:
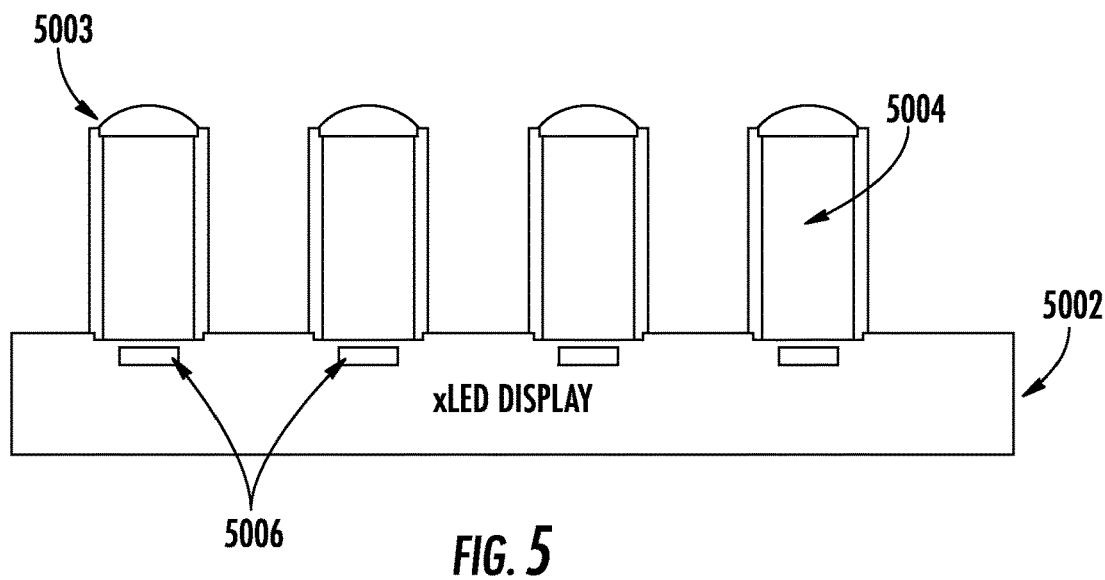
FIG. 5 is a schematic showing an embodiment of a system, device, apparatus, or method according to the current invention to manage, decrease, resolve, mitigate, prevent, or block stray light that uses an electronically enabled absorber between lenslets to block VD emitted stray light when synchronized with an active MLA and/or pulsed display.

FIG. 5 shows an embodiment of the invention having a display component 5002, such as an xLED display, comprising one or more pixels 5006, in optical communication with a lenslet 5003. In the example in FIG. 5, a light blocking column 5004 can be turned "on" and "off," as described herein.

Figure 6:
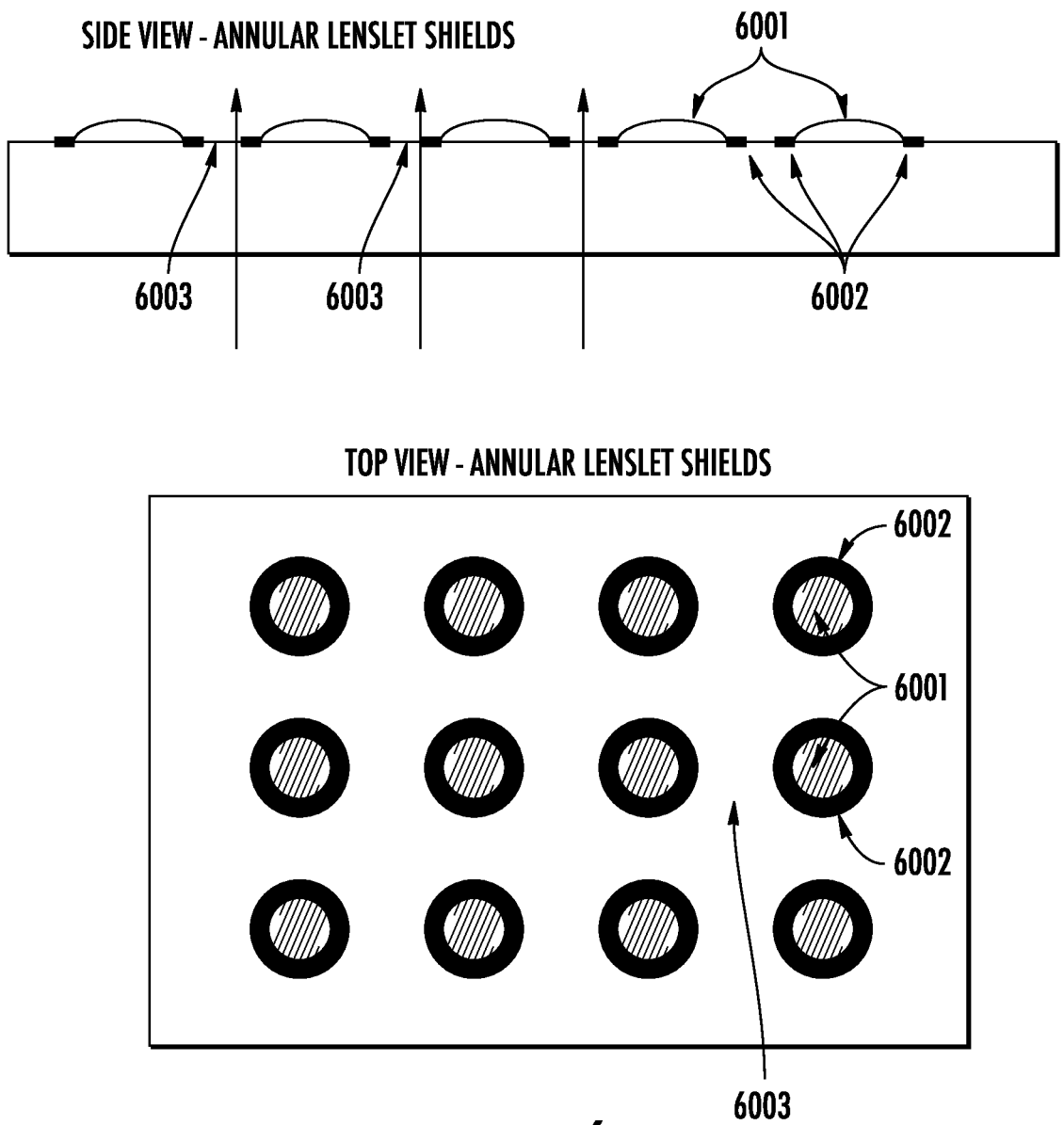
FIG. 6 is a schematic showing an embodiment of a system, device, apparatus, or method according to the current invention to manage, decrease, resolve, mitigate, prevent, or block stray light that uses an electronically enabled absorber between lenslets to block VD emitted stray light when synchronized with an active MLA and/or pulsed display.

FIG. 6 shows a side view and top view of for example an optical substrate comprising lenslets 6001 and annular, light-blocking shields 6002 around the lenslets, as described herein. The shields can be turned "on" and "off" as described herein and real world light can travel between the lenslets, in embodiments. The top view shows circular annular light blocking elements 6002 around the lenslets 6001, along with space between the lenslets 6003 for real world light transmission.

Figure 7A:
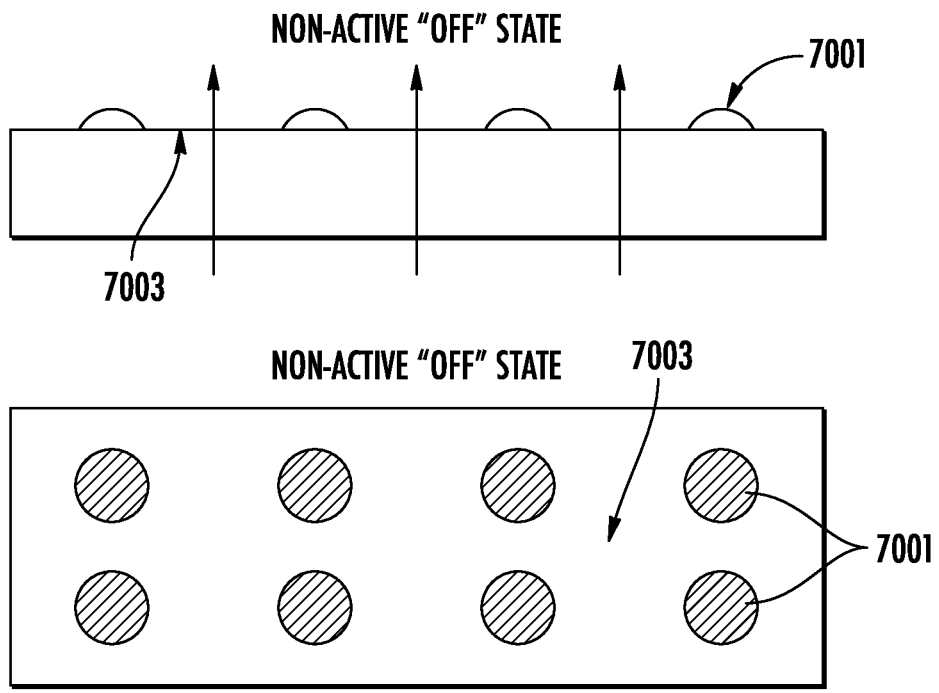
FIGS. 7A and 7B are depictions of an embodiment of a system, device, apparatus, or method according to the current invention to manage, decrease, resolve, mitigate, prevent, or block stray light that uses an electronically enabled absorber between lenslets to block VD emitted stray light when synchronized with an active MLA and/or pulsed display.
Figure 7B:
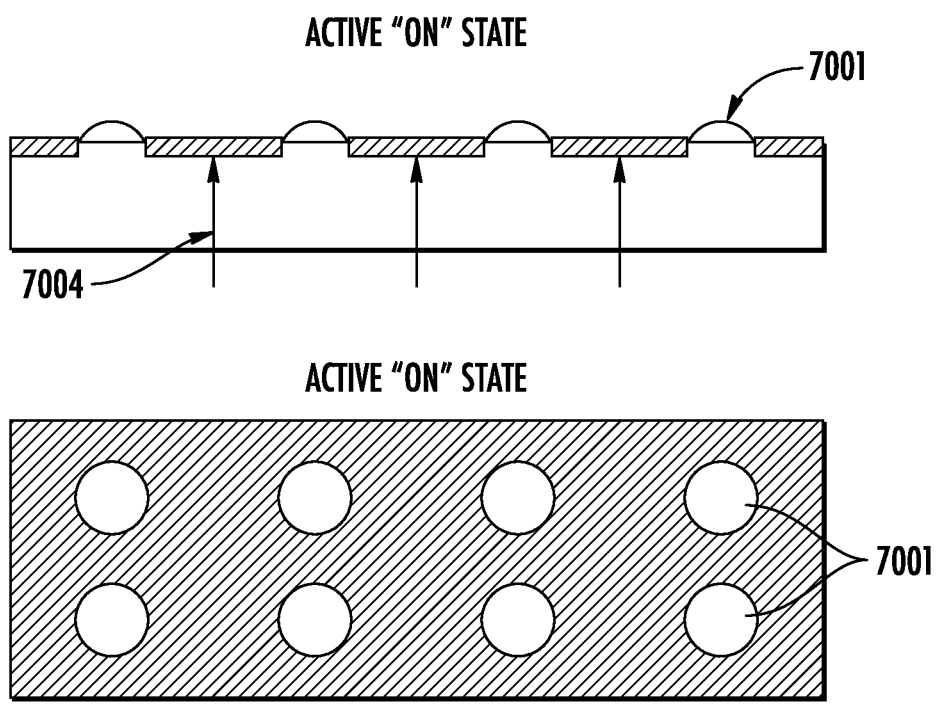

FIGS. 7A and 7B show a side view and top view of for example an optical substrate comprising lenslets 7001 (wherein the lenslets may be static or active (e.g., switchable and/or tunable)) and a light-blocking shield 7003 around the lenslets, as described herein. In the embodiment shown in FIG. 7, the entirety of the substrate around or holding the lenslets (such as all or part of the optical module substrate) can act as an active light blocker. The shield can be turned "on" and "off" as described herein and real world light can travel between the lenslets, in embodiments. For example, in FIG. 7A, the top view and side view show the substrate 7003 around the lenslets 7001, along with space between the lenslets for real world light transmission. In FIG. 7A, the active light blocking is in its non-active "off" state, allowing for the real world transmission of light (noted by the arrows in the side view). In FIG. 7B, the light blocking element around the lenslets 7001 is shown in both the side view and top view in the active "on" state. In this state, light is blocked around the lenslets so real world light and stray light is blocked from entering the eye (noted by arrow 7004 being blocked before passing through the substrate and to the eye).

System Operation

In embodiments, the timing of the activation of the beam splitter/mirror and the emission of the micro display is such that each individual image "frame" begins by triggering the beam splitter/mirror to turn "on" in order to generate a reflective state (e.g., fully or partially reflective). (See, e.g., FIG. 2.) In aspects, there may be a short time period that the beam splitter/mirror requires to transition from an "off" (e.g., plane window) see-through state to an "on" (e.g., "reflective") state. This "ramp-up" time, or "rise time," is usually measured in a few milliseconds or less. In aspects, an electronic circuit will "trigger" the activation of the beam splitter/mirror and then, after a preset activation time has passed and the beam splitter/mirror has settled into or achieved its "on" reflective state, the electronic circuit will trigger the micro display to display (flash or pulse) a virtual image, such as information to be reflected into the eye. The display can be of a short duration, on the order of around 30 milliseconds corresponding to an approximately 30 fps, but possibly shorter or longer, such as from 0-10 milliseconds, 10-20 milliseconds, 30-40 milliseconds, 40-50 milliseconds, and so on.

An advantage of operating the micro display in a pulse/flash mode as described herein is multifold. Electrically it enables "overdriving" the light emitting mechanism of the display, which makes the display capable of achieving a brighter (in cases, instantaneous) emission/brightness (in cases, measured in watts/Nits) than would be possible if the display was to operate in continuous emission mode (e.g., a "steady state"). This can be an advantage because it enables most displays to be able to better handle the electrical and thermal load due to an intermittent, e.g., "pulse," display activation without compromising its performance and lifespan. Additional functional advantages for the TOM described herein, based on, e.g., operation in an intermittent pulse mode (pulsed light), is that the retina of the eye perceives pulsed light intensity as brighter than the same intensity of light emitted in continuous (e.g., non-pulse) fashion, because humans are typically more sensitive to blinking/pulsing lights. Moreover, this pulse mode of operation is well suited to the temporal nature of the active beam splitter/mirror-based TOM architecture, which provides for both an intermittent bright image and a low stray light pass-through, which enables the viewer to more seamlessly perceive both the real-world and the augmented reality information (e.g., virtual image) naturally superimposed on each other in time merging into a combined scene (e.g., motion picture) as seen or perceived by the viewer. Thus, rapid alternating or oscillating between "off" and "on" state and/or between duty cycles allows for the presentation of rapid and sequential presentation of images in an order to create the perception of movement; when overlaid with a real world environment, this allows for creation of AR or MR, for example.

Pulsing the light and synchronizing the pulsed light with the beam splitter/mirror in the "on" state, preferably after the "rise" or "ramp up" time is complete and the beam splitter/mirror is in the reflective state, requires less energy than a steady state light and therefore creates less heat, which can be uncomfortable to a wearer using a near eye display system and which can more rapidly degrade the xLED and other system components. The partial duty cycle pulsing and synching also allows for a user or manufacturer to choose different modes of operation or functionality. For example, a user could switch the beam splitters/mirrors into an "off" state to create a see-through window. A user could use an "on" state to create a two-dimensional virtual image, which is preferable in some cases for virtual text. A user could use an "on" state to create three-dimensional images, such as when different parts of an object are to be perceived as being at different distances or depths from the user; for example, a beam splitter/mirror might have a different reflectivity while another beam splitter/mirror showing a second part of the object might have a different reflectivity.

The display pixels may be monochromatic (e.g., a single color such as Red, Green, or Blue) or polychromatic (e.g., capable of emitting any and all of the aforementioned colors). Different TOMs may have different combination of colors such as RGB and CMY (Cyan, Magenta, Yellow, etc.) to provide for a more rich color gamut and 3D effects.

If the optical system includes an ambient light sensor, the optical system can instantaneously or gradually adjust or adapt to changes in brightness, such as increasing or decreasing the duty cycle. In aspects, the duty cycle is capable of automatically adjusting (or in cases being manually adjusted) as a function of ambient light in the environment. In embodiments, when the ambient light is bright the duty cycle will be longer, meaning the pixels will remain activated (and the beam splitters/mirrors will be in the reflective state) for a longer period of time compared to the see-through aspect when the pixels are deactivated, the beam splitters/mirrors are in the see-through state, and the system, display, or portion of the display are in a see-through state. (See FIGS. 3-4—showing graphs which are not overlaid but which all share the same time axis, thereby depicting the relative timings of the signals/operations over about three cycles (about a 50% duty cycle in the example of FIG. 3).) While the duty cycle may change (e.g., when the "on" state may be longer in duration than the "off" state, such as in brighter environments), the frame rate of the sequential presentation of images (e.g., the motion picture of virtual images being presented to a user of the system) is capable of remaining constant, thereby allowing the user to move from different ambient lighting situations while not having the video, frame rate, motion pictures, images, frames, or other augmented reality experience negatively affected.

Figure 3:
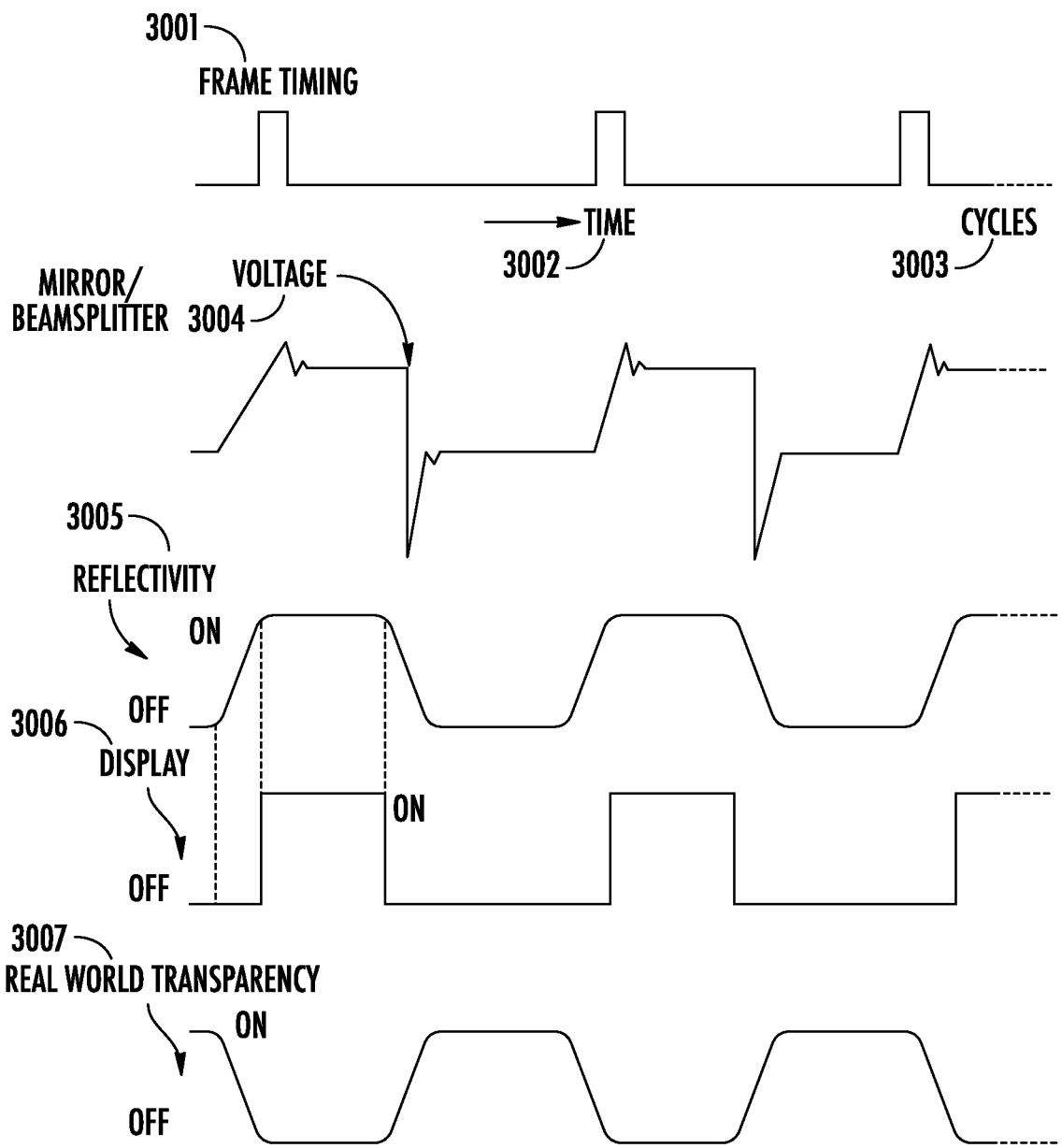
FIG. 3 is time scale showing a constant frame rate with changes to the duty cycle as a function of environmental ambient light, for example.

Thus, FIG. 3 indicates that the frame rate (or frame timing 3001) remains constant over time 3002 as it cycles 3003. However, if the wearer of the system moves to a bright or brighter environment, the system will need to compensate by making the virtual images appear brighter to the wearer, which may be accomplished by increasing the duration of the duty cycle, meaning the pixels remain "on" and the beam splitter/mirror is in the reflective state for a longer period of time. As can be seen in FIG. 3, voltage 3004 can applied to the active/switchable/tunable beam splitter/mirror for a longer period of time, thereby making the beam splitter/mirror provide the reflective state 3005 for a longer duration. Similarly, the display pixel(s) 3006 can be activated for a longer period of time when the beam splitter/mirror is in the reflective state. This increase of the duty cycle (increase of ratio of "on" to "off" time/state) renders the virtual image(s) brighter and better able to be perceived by a wearer of the system in a brighter environment. Thus, while FIG. 3 shows about a 50% duty cycle, the duty cycle can change based on ambient light conditions. Consequently, while duty cycles can all be the same length of time, the ratio of "on" to "off" can change as a function of ambient light. In examples, the duty cycle can have the "on" period last longer than the "off" period, such as in a bright environment when a wearer of the system should see the virtual image(s) for a longer duration than the real world environment (when the optical module is see-through or transparent 3007). This is reflected in FIG. 4, for example.

Figure 4:
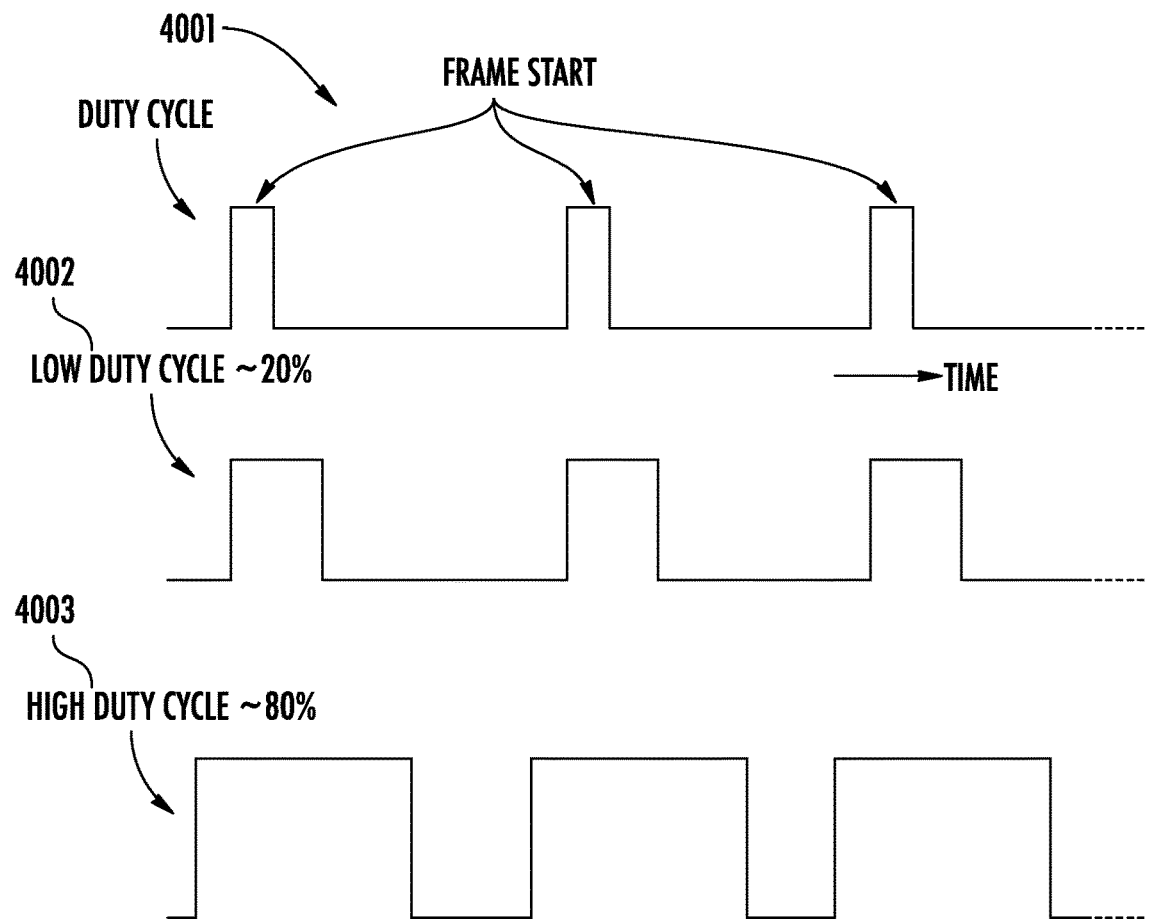
FIG. 4 is time scale showing a constant frame rate with changes to the duty cycle as a function of environmental ambient light, for example.

As shown in FIG. 4—which shows the difference between a high or higher duty cycle (also referred to herein as a longer duty cycle) (higher ratio of "on" to "off") 4003 and a low or lower duty cycle (also referred to herein as a shorter duty cycle) (lower ratio of "on" to "off") 4002 for a fixed frame rate 4001—in a low or lower light environment the duty cycle is capable of automatically adjusting to a lower/shorter duty cycle, meaning the virtual image brightness is decreased and the see-through state of the system is increased, thereby allowing the user to better see the (dimmer) real world environment. This allows the wearer of the system to be able to better see the real world environment in low light, while also seeing the virtual image(s), all while not having the frame rate negatively affected. More specifically as shown in FIG. 4, in a low light environment, the duty cycle may change the ratio of "on" to "off" state to prioritize the "off" state to enhance light from the real world to enter a wearer's eye; in other words, in a lower light environment, the beam splitter/mirror is in its reflective state for a shorter period of time. Similarly, the display pixel(s) are activated for a shorter period of time, thereby increasing the amount of time the system is in a see-through state and the wearer can see the real world environment. By way of example only, and not to limit the scope of the invention, a shorter duty cycle may be from 10% to 30% of the cycle having the beam splitter/mirror in the reflective state and the display pixel(s) activated (i.e., the "on" state), whereas a higher/longer duty cycle may have the beam splitter/mirror in the reflective state and the display pixel(s) activated (i.e., the "on" state) between 70% and 90% of the cycle.

An active/tunable/switchable beam splitter/mirror used in this fashion also resolves issues of stray light, blur, or imperfections in seeing a real world environment through the TOM, because the system will have increased transparency when the system is in "off" mode compared to, for example, a system using static beam splitters/mirrors or a system without pulsing light. This increased transparency when the beam splitters/mirrors are in "off" mode (e.g., see-through state) creates for a more realistic augmented reality experience by a user, including when combined with the enhanced virtual image brightness caused by the pulsed light.

In aspects and as understood by one of skill in the art, stray light is light that does not follow the correct or preferred path through the TOM and may produce a glare or background haze that reduces overall contrast of the desired images. The desired image light, in aspects, includes the real world view formed from light from the external world that passes through the transparent areas of the optical module, the beam splitters/mirrors, and/or the regions between the beam splitters/mirrors.

Real world light that passes through a beam splitter/mirror and is redirected is one form of stray light, as is real world light that bounces off the beam splitter/mirror. This is particularly a problem with static beam splitters/mirrors, which is a problem the current invention will help resolve.

The use of Liquid Crystals (LCs) is one way to realize the active beam splitter/mirror. A number of different LC technologies may be used separately or in combinations, these are, for example, conventional nematic or smectic phase and cholesteric liquid crystals. Additionally, in embodiments herein, polymer dispersed (or alternatively encapsulated) LCs (PDLCs) as well as their nano-scale variety (nPDLCs) may offer advantages for construction of the active beam splitter/mirror. Additionally, "blue" phase LCs can be used.

In FIG. 1A, a non-limiting embodiment is shown wherein when voltage is applied to a beam splitter/mirror comprising, e.g., liquid crystals embedded in a material region, the liquid crystals manipulate light (e.g., change from a see-through to reflective state) such that the beam splitter/mirror is in a reflective state, whereas in FIG. 1B, when voltage is removed from the beam splitter/mirror comprising, e.g., liquid crystals, the beam splitter/mirror transitions to a see-through state.

All of the above LC variations can be employed to construct conventional beam splitters/mirrors, as have been described herein. Further, all of the above technologies may be used separately or in combination in order to realize optimal beam splitter/mirror performance.

In addition to LCs, other technologies can be employed for fabrication of the beam splitters/mirrors; these include, but are not limited to, electrowetting, electrostatic, electrochromic, ferrofluidic, dielectric, and dielectrophoretic, and pressure actuated liquid beam splitters/mirrors. Various micro-mechanical beam splitters/mirrors may also be used such as elastomeric membranes, which are stretched or compressed by mechanical means. Chemically ion activated beam splitters/mirrors that utilize the various acousto-optical effects can also be employed as and/or in the beam splitters/mirrors.

Electrowetting (EW) Beam Splitters/Mirrors

EW lens' functionality relies on the ability to vary the surface tension of liquids via applied voltage, in aspects. For a given liquid drop, its surface tension generates a predictable radius of curvature which in turn refracts light either in convergent (or divergent) fashion, and can be used to change the beam splitter/mirror from a see-through state to a reflective state, and back again. With proper shaping of the container holding the liquid, a beam splitter or mirror can be realized.

For example, variable voltage can be applied to a pair of electrically conductive liquids to change the surface tension and therefore the radius of curvature via a change in voltage. In cases, such control over reflectivity can be used to vary the beam splitter/mirror's reflectivity (e.g., non-power plane window) to a reflective state (partially or fully reflective). Motion pictures can be perceived by a user through rapid temporally multiplexed images arranged to be sequential in time at frame rates as low as 20 frames per second ("fps"), although preferably at around 30 fps or higher.

In aspects, multiplexing refers to a method by which multiple analog or digital signals are combined into one signal over a shared medium. The aim is to share a scarce resource. Therefore, several signals or channels can be combined together and then separated at the receiver end. For example only, radio multiplexes several channels on an electromagnetic spectrum by assigning each channel its own frequency. Then a radio receiver can choose the channel it wants. By way of example only and non-limiting in terms of the current application's scope, time multiplexing is in some aspects similar to having a freight train with several box cars, wherein each car represents a slice in time. A portion of a signal is concentrated and assigned to a car. Upon delivery, the desired signal is extracted from each slot/car and recombined.

With respect to the currently described multiplexed system described herein, the optical system assigns time periods when the display (e.g., display pixels) is enabled or activated, and time periods when the real world is viewed through, for example, one or more beamsplitters or mirrors in a see-through ("off") state. Preferably the system does not want a user's eyes to extract, see, or perceive each individual time slot. Rather, the system preferably provides a continual virtual display and continual real world view. Thus, the time periods of the display, for example, are presented rapidly and sequentially (in order) to create the perception of a moving (or alternatively "live" (as opposed to static)) virtual image/object, in embodiments. These are presented along with rapid portions of time when the system is see-through. When you combine rapid periods (alternatively interval durations,) of display and rapid periods of the user being able to see the real world, it creates an augmented reality experience wherein a user perceives a seamless or near-seamless moving virtual image, in aspects, overlaid (or superimposed) over the real world. However, if one was to review the electronic control signals, there would exist time slots assigned to the virtual display (a frame, for example) and the remainder of the time assigned to the real world view. Therefore, in aspects, the time multiplexed system described herein has two channels. And in aspects, when the frames/images are seen at an "on" state of the beam splitter/mirror and the display, they are fused and perceived as "on" state animation through the time of "on" and "off" states. The technique/system described herein, in embodiments, takes advantage of the limited ability of the human visual system to perceive high spatio-temporal frequencies.

Using another example, the human eye/brain interaction can demultiplex the time sequence if the frame rate is well below about 20 frames per second. That is, the virtual image appears to flicker at low frame rates. Above that frame rate, the human perceptual system cannot separate the image/frame stream, and it appears to flow from one frame to the next. Thus the real world view and the virtual image information is prepared in a time multiplexed form, but a wearer's perception (eye/brain interaction) is not able to demultiplex the stream and both signals appear combined to be natural and stream simultaneously to the wearer, wherein the continuous image/frame stream is overlaid with a real world view, providing augmented reality to the wearer.

EW beam splitters/mirrors can be realized using a number of available liquids. Examples of liquids which can be used are, by way of example, various alcohols, more complex hydrocarbons, both solvents and oils, and water. Mercury is also a candidate, but it is typically not applicable to realizing EW beam splitters/mirrors operating in transmission, rather than in reflection. Electronically, the EW system operates as a (variable) capacitor that dissipates little to no heat and therefore it "consumes" low power and its response can be in the sub-millisecond range for sub-millimeter class EW beam splitters/mirrors.

The active beam splitter/mirror technologies described herein can be used separately and/or in combination to optimize image quality and also to minimize undesired stray light.

Figure 2:
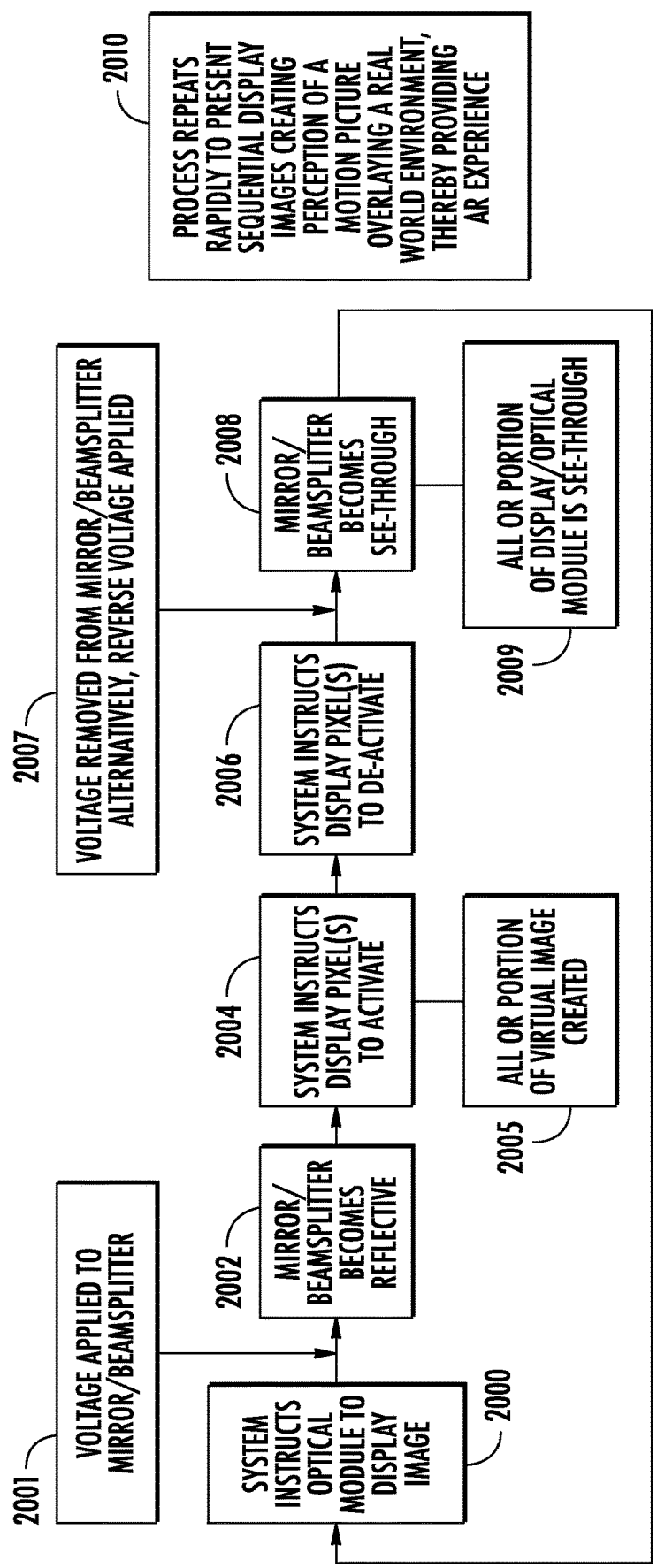
FIG. 2 is a flowchart showing an embodiment of the invention described herein as a timeline.

Turning to particular figures, FIG. 2 shows a possible embodiment of the present invention for the system instructing the optical module to display an image or part of an image 2000. In this example, voltage (or current) is applied to a beam splitter/mirror, some beam splitters/mirrors, or all the beam splitters/mirrors 2001. In response to the voltage (or current) the beam splitters/mirrors transition to a reflective state 2002, such as partially, mostly, substantially, or completely reflective. The beam splitters/mirrors reach the reflective state and the system instructs the display pixel(s) to activate 2004, which provides all or a portion of a virtual image to a wearer of the system 2005. Then the system instructs the display pixel(s) to de-activate 2006 and a voltage (or current) is removed from the beam splitters/mirrors, or, optionally, a reverse-voltage or reverse-current is applied to the beam splitters/mirrors 2007, and the beam splitters/mirrors reach a see-through state 2008 (such as partially, mostly, substantially, or completely transmissive to real world light), rendering all or a portion of the display/optical module see-through so a wearer of the system can see through to the outside real world environment 2009. This process repeats rapidly to present sequential display images creating a perception of a motion picture overlaying the real world environment, thereby providing an AR experience to the wearer 2010.

The current invention includes several Aspects, including the following:

Aspect 1: An augmented reality optical system, the optical system comprising:
- a first light stream incoming from and generated by a pulsed light emitting display;
- a second light stream incoming from a real world environment; and
- one or more active beam splitter capable of transitioning from an active state to a non-active state and the one or more active beam splitter operative to both reflect the first light stream and allow the second light stream to pass through the one or more active beam splitter;
- wherein the one or more active beam splitter is synchronized with the pulsed light emitting display to reflect the first light stream in the active state towards an eye of a user to show at least part of a virtual image when the pulsed light emitting display generates the first light stream; and
- wherein when the pulsed light emitting display is not generating the first light stream, the active beam splitter is in the non-active state to allow the second light stream to pass through the one or more active beam splitter and towards the eye of the user.

Aspect 2: The augmented reality optical system of Aspect 1, wherein at least a portion of the second light stream transmits through the one or more active beams splitter and towards the eye of the user when the one or more active beam splitter is in the active state.

Aspect 3: The augmented reality optical system of Aspect 1, wherein when the one or more active beam splitter is in the non-active state, the optical system is about 85% transparent or higher.

Aspect 4: The augmented reality optical system of Aspect 1, wherein when the one or more active beam splitter is in the non-active state, the optical system is at least 80% transparent.

Aspect 5: The augmented reality optical system of Aspect 1, further comprising a processor and a storage having encoded thereon executable instructions that, when executed by the processor, cause the processor to carry out creating a rapid sequence of virtual images to create a perception of a motion picture, motion graphics, an animation, or combinations thereof.

Aspect 6: The augmented reality optical system of Aspect 5, wherein the rapid sequence of virtual images is over about 20 frames per second.

Aspect 7: The augmented reality optical system of Aspect 5, wherein the rapid sequence of virtual images occurs at a rate capable of allowing the user of the optical system to perceive combined virtual images in a seamless or substantially seamless motion picture or a stable virtual image.

Aspect 8: The augmented reality optical system of Aspect 1, further comprising a processor and a storage having encoded thereon executable instructions that, when executed by the processor, cause the processor to carry out automatically determining an amount of frames per second for a video, and the automatic frames per second determination is dependent on video content, imagery content, or system application.

Aspect 9: The augmented reality optical system of Aspect 1, further comprising a processor and a storage having encoded thereon executable instructions that, when executed by the processor, cause the processor to carry out stitching virtual images or parts of virtual images together to create a perception of a combined image, a motion picture, motion graphics, an animation, or combinations thereof.

Aspect 10: The augmented reality optical system of Aspect 1, wherein the one or more active beam splitter comprises one or more of electrostatic, dielectrophoretic, electrochromic, electrowetting lenses, liquid crystals, polymer micro and nano-dispersed liquid crystals, or combinations thereof.

Aspect 11: The augmented reality optical system of Aspect 1, further comprising:
- an ambient light sensor;
- a processor; and
- a storage having encoded thereon executable instructions that, when executed by the processor, cause the processor to carry out automatically determining a duty cycle of the optical system, the one or more active beam splitter, or combinations thereof, depending on an amount of environmental ambient light, and wherein when the optical system is in a low-light environment a short duty cycle is applied, and wherein when the system is in a high-light or bright environment a longer duty cycle is applied.

Aspect 12: The augmented reality optical system of Aspect 1, further comprising:
- an ambient light sensor;
- a processor; and
- a storage having encoded thereon executable instructions that, when executed by the processor, cause the processor to carry out automatically determining a duty cycle of the optical system, the one or more active beam splitter, or combinations thereof, and wherein when the optical system is in a low light environment the optical system instructs the one or more active beam splitter to operate in the non-active state for a longer duration of time than the active state.

Aspect 13: The augmented reality optical system of Aspect 1, further comprising:
- an ambient light sensor;
- a processor; and
- a storage having encoded thereon executable instructions that, when executed by the processor, cause the processor to carry out automatically determining a duty cycle of the optical system, the one or more active beam splitter, or combinations thereof, and wherein when the optical system is in a high-light or bright environment the optical system instructs the one or more active beam splitter to operate in the active state for a longer duration of time than the non-active state.

Aspect 14: The augmented reality optical system of Aspect 1, further comprising:
- an ambient light sensor;
- a processor; and
- a storage having encoded thereon executable instructions that, when executed by the processor, cause the processor to carry out automatically determining a duty cycle of the optical system, the one or more active beam splitter, or combinations thereof, and wherein the duty cycle is dependent on an amount of ambient light in the real world environment.

Aspect 15: The augmented reality optical system of Aspect 1, further comprising:
- an ambient light sensor;
- a processor; and
- a storage having encoded thereon executable instructions that, when executed by the processor, cause the processor to carry out automatically determining a rapid activation or duration of the optical system, the one or more active beam splitter, or combinations thereof, and wherein the rapid activation or duration is dependent on an amount of ambient light in the real world environment.

Aspect 16: The augmented reality optical system of Aspect 1, further comprising:
- an ambient light sensor;
- a processor; and
- a storage having encoded thereon executable instructions that, when executed by the processor, cause the processor to carry out automatically determining a duty cycle of the optical system based on ambient light conditions and monitoring ambient light conditions to modify the duty cycle based on the ambient light conditions.

Aspect 17: The augmented reality optical system of Aspect 1, further comprising:
- an ambient light sensor;
- a processor; and
- a storage having encoded thereon executable instructions that, when executed by the processor, cause the processor to carry out automatically computing and applying a duty cycle of the optical system to maintain a virtual image quantity or quality and see-through quantity or quality as an ambient light environment fluctuates or changes.

Aspect 18: An optical system comprising:
- an optical module comprising a display comprising a plurality of display pixels;
- one or more switchable or tunable beam splitter;
- wherein the plurality of display pixels and the one or more switchable or tunable beam splitter are synchronized or coordinated, wherein when a voltage or current is supplied to the one or more switchable or tunable beam splitter, the one or more switchable or tunable beam splitter transitions from a see-through state to a reflective state;
- wherein when the optical system instructs the one or more switchable or tunable beam splitter to operate in the reflective state, the optical system substantially simultaneously instructs the plurality of display pixels to activate, thereby rendering a virtual image or a part of a virtual image to a user of the optical system;
- wherein when the voltage or current is removed from the one or more switchable or tunable beam splitter, or alternatively when a reverse-voltage or reverse-current is supplied to the one or more switchable or tunable beam splitter, the optical system instructs the plurality of display pixels to de-activate, rendering an area or volume of the optical module in the see-though state, wherein the see-through state allows the user of the optical system to see through the area or volume of the optical module to a real world environment;
- wherein the optical system pulses the synchronized or coordinated one or more switchable or tunable beam splitter and the plurality of display pixels, rendering the optical system capable of cycling the reflective state of the one or more switchable or tunable beam splitter and activation of the plurality of display pixels to render a sequential presentation of virtual images or parts of virtual images combined with a real world view;
- wherein time multiplexing of the sequential presentation of the virtual images or the parts of the virtual images is capable of presenting the virtual images or the parts of the virtual images as a continuously flowing or moving of the virtual images or the parts of the virtual images, wherein overlaying the continuously flowing or moving virtual images or parts of the virtual images with the real world view renders the optical system capable of creating an experience or perception of at least one of augmented reality, mixed reality, extended reality, enhanced reality, and virtual reality, to the user of the optical system.

Aspect 19: The optical system of Aspect 18, wherein when the optical system is in the see-through state, the optical system is about 85% transparent or higher.

Aspect 20: The optical system of Aspect 18, wherein when the optical system is in the see-through state, the optical system is at least 80% transparent.

Aspect 21: The optical system of Aspect 18, wherein the time multiplexing of the sequential presentation of the virtual images or the parts of the virtual images creates a perception of a motion picture, motion graphics, an animation, or combinations thereof, to the user of the optical system.

Aspect 22: The optical system of Aspect 18, wherein the time multiplexing of the sequential presentation of the virtual images or the parts of the virtual images is over about 20 frames per second.

Aspect 23: The optical system of Aspect 18, wherein the time multiplexing of the sequential presentation of the virtual images or the parts of the virtual images occurs at a rate capable of allowing the user of the optical system to perceive at least one of: (a) combined virtual images or parts of the virtual images in a seamless or mostly seamless motion picture, and (b) a stable virtual image or a stable part of a virtual image.

Aspect 24: The optical system of Aspect 18, further comprising:
- a processor; and
- a storage having encoded thereon executable instructions that, when executed by the processor, cause the processor to carry out automatically determining an amount of frames per second for a video, and the automatic frames per second determination is dependent on video content, imagery content, or optical system application.

Aspect 25: The optical system of Aspect 18, further comprising:
- a processor; and
- a storage having encoded thereon executable instructions that, when executed by the processor, cause the processor to carry out stitching the virtual images or parts of the virtual images together to create a perception of a combined image, a motion picture, motion graphics, an animation, or combinations thereof, to the user of the optical system.

Aspect 26: The optical system of Aspect 18, further comprising:
- an ambient light sensor;
- a processor; and
- a storage having encoded thereon executable instructions that, when executed by the processor, cause the processor to carry out automatically determining a duty cycle of the optical system, the one or more switchable or tunable beam splitter, the plurality of display pixels, or combinations thereof, depending on an amount of environmental ambient light; and wherein when the optical system is in a low-light environment a short duty cycle is applied, and wherein when the system is in a high-light or bright environment a longer duty cycle is applied.

Aspect 27: The optical system of Aspect 18, further comprising:

an ambient light sensor;
a processor; and
a storage having encoded thereon executable instructions that, when executed by the processor, cause the processor to carry out automatically determining a duty cycle of the optical system, the one or more switchable or tunable beam splitter, the plurality of display pixels, or combinations thereof;
wherein when the optical system is in a low light environment the optical system instructs the one or more switchable or tunable beam splitter to operate in the see-through state for a longer duration of time than the reflective state; and
wherein when the optical system is in a high-light or bright environment the optical system instructs the one or more switchable or tunable beam splitter to operate in the reflective state for a longer duration of time than the see-through state.

Aspect 28: The optical system of Aspect 18, further comprising:

an ambient light sensor;
a processor; and
a storage having encoded thereon executable instructions that, when executed by the processor, cause the processor to carry out automatically determining a duty cycle of the optical system, the one or more switchable or tunable beam splitter, the plurality of display pixels, or combinations thereof, and wherein the duty cycle is dependent on an amount of ambient light in the real world environment.

Aspect 29: An optical system comprising:

an optical module comprising:
  a display comprising a plurality of pixels;
  an active beam splitter or mirror capable of cycling between a state reflecting light from the display and a see-through state;
wherein the display is synchronized with the active beam splitter or mirror to activate when the active beam splitter or mirror is approaching or reaches the state reflecting light from the display; and
wherein all or a portion of the optical module is in the see-through state when the active beam splitter or mirror is in the see-through state and the display is deactivated.

Aspect 30: An optical system comprising:

an optical module comprising a display comprising a plurality of display pixels and one or more active beam splitters or mirrors;
a processor and a storage having encoded thereon executable instructions that, when executed by the processor, cause the processor to carry out the following:
switching the one or more active beam splitters or mirrors to a reflective state when a first change in voltage or current to the one or more active beam splitters or mirrors occurs;
instructing the plurality of display pixels to activate and render a virtual image or part of a virtual image to a user of the optical system at or near the time when the one or more active beam splitters or mirrors switch to the reflective state;
instructing the plurality of display pixels to de-activate, rendering the one or more active beam splitters or mirrors in a see-though state, when a second change in voltage or current to the one or more active beam splitters or mirrors occurs; and
pulsing the optical system through a plurality of duty cycles,
the duty cycles comprising a first period of time when the processor is instructing the one or more active beam splitters or mirrors to operate in the reflective state and the plurality of display pixels to activate and thereby render the virtual image or the part of the virtual image to the user of the optical system, and a second period of time when the processor is instructing the one or more active beam splitters or mirrors to operate in the see-though state and the plurality of display pixels to deactivate;
wherein a frame rate of a sequential presentation of the virtual image or the part of the virtual image rendered by the optical system does not change when one or more of the plurality of duty cycles changes.

In aspects herein, a light stream can mean any one or more of the following: light created or reflected by a real world environment, light created or reflected by a real world object, light beams, light rays, light emitted from a display, light emitted from one or more pixels, light emitted from one or more pixel patches, light emitted from one or more groups of pixels or pixel patches, light emitted from patch units, light emitted from patch groups, light emitted from an optical system, light emitted from a near eye display, light emitted from a microdisplay, light coming from a microlens or microlens array, and light coming from or generated by an optical module. By way of example, a light stream can be light generated by a near eye display, as described herein.

Embodiments of the invention also include a computer readable medium comprising one or more computer files containing applications, frameworks, libraries, and such, comprising a set of computer-executable instructions for performing one or more of the calculations, steps, processes and operations described and/or depicted herein. In exemplary embodiments, the files may be stored contiguously or non-contiguously on the computer-readable and/or device-readable medium. Embodiments may include a computer program product comprising the computer files, either in the form of the computer-readable medium comprising the computer files and, optionally, made available to a consumer through packaging, or alternatively made available to a consumer through electronic distribution. As used in the context of this specification, a "computer-readable medium" is a non-transitory computer-readable medium and includes any kind of computer memory such as floppy disks, conventional hard disks, CD-ROM, Flash ROM, non-volatile ROM, electrically erasable programmable read-only memory (EEPROM), memory card, and RAM. In exemplary embodiments, the computer readable medium has a set of instructions stored thereon which, when executed by a processor, cause the processor to perform tasks, based on data stored in the electronic database on the computer or cloud, or memory described herein. The processor may implement this process through any of the procedures discussed in this disclosure or through any equivalent procedure.

In other embodiments of the invention, files comprising the set of computer-executable instructions may be stored in computer-readable memory on a single computer or distributed across multiple computers, in personal communication device and/or devices, or be stored in cloud computer. A skilled artisan will further appreciate, in light of this disclosure, how the invention can be implemented, in addition to software, using hardware or firmware. As such, as used herein, the operations of the invention can be implemented in a system comprising a combination of software, hardware, and/or firmware.

Embodiments of this disclosure include one or more computers or devices loaded with a set of the computer-executable instructions described herein. The computers or devices may be a general purpose computer, a special-purpose computer, personal communication device, or other programmable data processing apparatus to produce a particular machine, such that the one or more computers or devices are instructed and configured to carry out the calculations, sensor data collecting and processing, processes, steps, operations, algorithms, statistical methods, formulas, or computational routines of this disclosure. The computer or device performing the specified calculations, processes, steps, operations, algorithms, statistical methods, formulas, or computational routines of this disclosure may comprise at least one processing element such as a central processing unit (e.g., processor or System on Chip ("SOC")) and a form of computer-readable memory which may include random-access memory ("RAM") or read-only memory ("ROM"). The computer-executable instructions can be embedded in computer hardware or stored in the computer-readable memory such that the computer or device may be directed to perform one or more of the calculations, steps, processes and operations depicted and/or described herein.

Additional embodiments of this disclosure comprise a computer system for carrying out the computer-implemented method of this disclosure. The computer system may comprise a processor for executing the computer-executable instructions, one or more electronic databases containing the data or information described herein, an input/output interface or user interface, and a set of instructions (e.g., software) for carrying out the method. The computer system can include a stand-alone computer, such as a desktop computer, a portable computer, such as a tablet, laptop, PDA, wearable device (e.g., electronic watch, smart glasses or HMD—Head Mounted Display), or smartphone, or a set of computers connected through a network including a client-server configuration and one or more database servers. The network may use any suitable network protocol, including IP, UDP, or ICMP, and may be any suitable wired or wireless network including any local area network, wide area network, Internet network, telecommunications network, Wi-Fi enabled network, or Bluetooth enabled network. In one embodiment, the computer system comprises a central computer connected to the internet that has the computer-executable instructions stored in memory that is operably connected to an internal electronic database. The central computer may perform the computer-implemented method based on input and commands received from remote computers through the internet. The central computer may effectively serve as a server and the remote computers may serve as client computers such that the server-client relationship is established, and the client computers issue queries or receive output from the server over a network.

The input/output user interfaces may include a graphical user interface (GUI), voice command interface, gesture interface, gaze interface, or combinations thereof, which may be used in conjunction with the computer-executable code and electronic databases. The graphical user interface gesture interface, gaze interface, or combinations thereof, may allow a user to perform these tasks through the use of text fields, check boxes, pull-downs, command buttons, voice commands, various gestures gaze as a selection mechanism, and the like. A skilled artisan will appreciate how such user features may be implemented for performing the tasks of this disclosure. The user interface may optionally be accessible through a computer connected to the internet. In one embodiment, the user interface is accessible by typing in an internet address through an industry standard web browser and logging into a web page. The user interface may then be operated through a remote computer (client computer) accessing the web page and transmitting queries or receiving output from a server through a network connection.

The present invention has been described with reference to particular embodiments having various features. In light of the disclosure provided above, it will be apparent to those skilled in the art that various modifications and variations can be made in the practice of the present invention without departing from the scope or spirit of the invention. One skilled in the art will recognize that the disclosed features may be used singularly, in any combination, or omitted based on the requirements and specifications of a given application or design. When an embodiment refers to "comprising" certain features, it is to be understood that the embodiments can alternatively "consist of" or "consist essentially of" any one or more of the features. Other embodiments of the invention will be apparent to those skilled in the art from consideration of the specification and practice of the invention.

It is noted that where a range of values is provided in this specification, each value between the upper and lower limits of that range is also specifically disclosed. The upper and lower limits of these smaller ranges may independently be included or excluded in the range as well. The singular forms "a," "an," and "the" include plural referents unless the context clearly dictates otherwise. It is intended that the specification and examples be considered as exemplary in nature and that variations that do not depart from the essence of the invention fall within the scope of the invention. Further, all of the references cited in this disclosure are each individually incorporated by reference herein in their entireties and as such are intended to provide an efficient way of supplementing the enabling disclosure of this invention as well as provide background detailing the level of ordinary skill in the art.

As used herein, the term "about" refers to plus or minus 5 units (e.g., percentage) of the stated value.

Reference in the specification to "some embodiments," "an embodiment," "one embodiment" or "other embodiments" means that a particular feature, structure, or characteristic described in connection with the embodiments is included in at least some embodiments, but not necessarily all embodiments, of the inventions.

As used herein, the term "substantial" and "substantially" refers to what is easily recognizable to one of ordinary skill in the art.

It is to be understood that the phraseology and terminology employed herein is not to be construed as limiting and are for descriptive purpose only.

It is to be understood that the details set forth herein do not construe a limitation to an application of the invention.

Furthermore, it is to be understood that the invention can be carried out or practiced in various ways and that the invention can be implemented in embodiments other than the ones outlined in the description above.

The invention claimed is:

1. An augmented reality optical system comprising:
a pulsed light emitting display generating a first light stream when in an on state;
a second light stream incoming from a real world environment;
one or more active beam splitters capable of transitioning from an active state to a non-active state and the one or more active beam splitters operative to both reflect the first light stream and allow the second light stream to pass through the one or more active beam splitters;
a processor; and
a storage having encoded thereon executable instructions that, when executed by the processor, cause the processor to carry out synchronizing on states of the pulsed light emitting display and active states of the one or more active beam splitters, such that when the pulsed light emitting display is in the on state the one or more active beam splitters transition to the active state, and when the pulsed light emitting display is in the off state the one or more active beam splitters transition to the non-active state;
wherein the one or more active beam splitters in the active state reflect the first light stream towards an eye of a user to show at least part of a virtual image; and
wherein the one or more active beam splitters in the non-active state allow the second light stream to pass through the one or more active beam splitters and towards the eye of the user.

2. The augmented reality optical system of claim 1, wherein at least a portion of the second light stream transmits through the one or more active beams splitters and towards the eye of the user when the one or more active beam splitters is in the active state.

3. The augmented reality optical system of claim 1, wherein when the one or more active beam splitters is in the non-active state, the augmented reality optical system is about 85% transparent or higher.

4. The augmented reality optical system of claim 1, wherein when the one or more active beam splitters is in the non-active state, the augmented reality optical system is at least 80% transparent.

5. The augmented reality optical system of claim 1, wherein the processor and the storage having encoded thereon executable instructions, when executed by the processor, cause the processor to carry out creating a rapid sequence of virtual images to create a perception of a motion picture, motion graphics, an animation, or combinations thereof.

6. The augmented reality optical system of claim 5, wherein the rapid sequence of virtual images is over about 20 frames per second.

7. The augmented reality optical system of claim 5, wherein the rapid sequence of virtual images occurs at a rate capable of allowing the user of the augmented reality optical system to perceive combined virtual images in a seamless or substantially seamless motion picture or a stable virtual image.

8. The augmented reality optical system of claim 1, wherein the processor and the storage having encoded thereon executable instructions, when executed by the processor, cause the processor to carry out automatically determining an amount of frames per second for a video, and the automatic frames determination is dependent on video content, imagery content, and/or system application.

9. The augmented reality optical system of claim 1, wherein the processor and the storage having encoded thereon executable instructions, when executed by the processor, cause the processor to carry out stitching virtual images or parts of virtual images together to create a perception of a combined image, a motion picture, motion graphics, an animation, or combinations thereof.

10. The augmented reality optical system of claim 1, wherein the one or more active beam splitters comprise one or more of electrostatic, dielectrophoretic, electrochromic, electrowetting lenses, liquid crystals, polymer micro and nano-dispersed liquid crystals, or combinations thereof.

11. The augmented reality optical system of claim 1, further comprising
an ambient light sensor; and
wherein the processor and
the storage having encoded thereon executable instructions, when executed by the processor, cause the processor to carry out automatically determining a duty cycle of the augmented reality optical system, the one or more active beam splitters, or combinations thereof, depending on an amount of environmental ambient light, and wherein when the augmented reality optical system is in a low-light environment a shorter duty cycle is applied, and wherein when the augmented reality optical system is in a high-light or bright environment a longer duty cycle is applied.

12. The augmented reality optical system of claim 1, further comprising
an ambient light sensor; and
wherein the processor and
the storage having encoded thereon executable instructions, when executed by the processor, cause the processor to carry out automatically determining a duty cycle of the augmented reality optical system, the one or more active beam splitters, or combinations thereof, and wherein when the augmented reality optical system is in a low light environment the augmented reality optical system instructs the one or more active beam splitters to operate in the non-active state for a longer duration of time than the active state.

13. The augmented reality optical system of claim 1, further comprising
an ambient light sensor; and
wherein the processor and
the storage having encoded thereon executable instructions, when executed by the processor, cause the processor to carry out automatically determining a duty cycle of the augmented reality optical system, the one or more active beam splitters, or combinations thereof, and wherein when the augmented reality optical system is in a high-light or bright environment the augmented reality optical system instructs the one or more active beam splitters to operate in the active state for a longer duration of time than the non-active state.

14. The augmented reality optical system of claim 1, further comprising
an ambient light sensor; and
wherein the processor and
the storage having encoded thereon executable instructions, when executed by the processor, cause the processor to carry out automatically determining a duty cycle of the augmented reality optical system, the one or more active beam splitters, or combinations thereof, and wherein the duty cycle is dependent on an amount of ambient light in the real world environment.

15. The augmented reality optical system of claim 1, further comprising
an ambient light sensor; and
wherein the processor and
the storage having encoded thereon executable instructions, when executed by the processor, cause the processor to carry out automatically determining a rapid activation or duration of the augmented reality optical system, the one or more active beam splitters, or combinations thereof, and wherein the rapid activation or duration is dependent on an amount of ambient light in the real world environment.

16. An augmented reality optical system comprising:
a first light stream incoming from and generated by a pulsed light emitting display;
a second light stream incoming from a real world environment;
one or more active beam splitters capable of transitioning from an active state to a non-active state and the one or more active beam splitters operative to both reflect the first light stream and allow the second light stream to pass through the one or more active beam splitters, wherein the one or more active beam splitters is synchronized with the pulsed light emitting display to reflect the first light stream in the active state towards an eye of a user to show at least part of a virtual image when the pulsed light emitting display generates the first light stream, and wherein when the pulsed light emitting display is not generating the first light stream, the one or more active beam splitters is in the non-active state to allow the second light stream to pass through the one or more active beam splitters and towards the eye of the user;
an ambient light sensor;
a processor; and
a storage having encoded thereon executable instructions that, when executed by the processor, cause the processor to carry out automatically determining a duty cycle of the augmented reality optical system based on ambient light conditions and monitoring ambient light conditions to modify the duty cycle based on the ambient light conditions.

17. An augmented reality optical system comprising:
a first light stream incoming from and generated by a pulsed light emitting display;
a second light stream incoming from a real world environment;
one or more active beam splitters capable of transitioning from an active state to a non-active state and the one or more active beam splitters operative to both reflect the first light stream and allow the second light stream to pass through the one or more active beam splitters, wherein the one or more active beam splitters is synchronized with the pulsed light emitting display to reflect the first light stream in the active state towards an eye of a user to show at least part of a virtual image when the pulsed light emitting display generates the first light stream, and wherein when the pulsed light emitting display is not generating the first light stream, the one or more active beam splitters is in the non-active state to allow the second light stream to pass through the one or more active beam splitters and towards the eye of the user;
an ambient light sensor;
a processor; and
a storage having encoded thereon executable instructions that, when executed by the processor, cause the processor to carry out automatically computing and applying a duty cycle of the augmented reality optical system to maintain a virtual image quantity and/or quality and see-through quantity and/or quality as an ambient light environment fluctuates or changes.

18. An augmented reality optical system comprising:
a display comprising a plurality of pixels;
an active beam splitter or mirror capable of cycling between a state reflecting light from the display and a see-through state;
wherein the display is synchronized with the active beam splitter or mirror to activate when the active beam splitter or mirror is approaching or reaches the state reflecting light from the display;
wherein the display is synchronized with the active beam splitter or mirror to de-activate when the active beam splitter or mirror is approaching or reaches the see-through state;
wherein the display pulses between an activated light-emitting state and a non-light-emitting state, wherein when the display is in the activated light-emitting state the active beam splitter or mirror is synchronized with the display to be in the state reflecting light from the display, and wherein when the display is in the non-light-emitting state the active beam splitter or mirror is in the see-through state.

19. An augmented reality optical system comprising:
an optical module comprising a display comprising a plurality of display pixels and one or more active beam splitters or mirrors;
a processor and a storage having encoded thereon executable instructions that, when executed by the processor, cause the processor to carry out the following:
switching the one or more active beam splitters or mirrors to a reflective state when a first change in voltage or current to the one or more active beam splitters or mirrors occurs;
instructing the plurality of display pixels to activate and render a virtual image or part of a virtual image to a user of the optical system at or near the time when the one or more active beam splitters or mirrors switch to the reflective state;
instructing the plurality of display pixels to de-activate, rendering the one or more active beam splitters or mirrors in a see-though state, when a second change in voltage or current to the one or more active beam splitters or mirrors occurs; and
pulsing the optical system through a plurality of duty cycles, the duty cycles comprising a first period of time when the processor is instructing the one or more active beam splitters or mirrors to operate in the reflective state and the plurality of display pixels to activate and thereby render the virtual image or the part of the virtual image to the user of the optical system, and a second period of time when the processor is instructing the one or more active beam splitters or mirrors to operate in the see-though state and the plurality of display pixels to deactivate;
wherein a frame rate of a sequential presentation of the virtual image or the part of the virtual image rendered by the optical system does not change when one or more of the plurality of duty cycles changes.

* * * * *